Patented Nov. 6, 1945

2,388,616

UNITED STATES PATENT OFFICE 2,388,616

USE OF DEHUMIDIFICATION AGENTS

William A. La Lande, Jr., Upper Darby, Pa., assignor to Attapulgus Clay Company, Philadelphia, Pa., a corporation of Delaware No Drawing. Application August 28, 1942,
Serial No. 456,727

7 Claims. (Cl. 210—42.5)

The present invention relates to the preparation and use of improved dehumidifying or dehydrating agents, and particularly those derivable from argillaceous adsorbents such as bentonite, acid activated bentonite, and fuller's earth.

The object of this invention is the preparation from inexpensive adsorbents such as bentonite, acid activated bentonite, and fuller's earth, of an agent capable of effecting substantially complete dehumidification or dehydration of fluids.

Fluids such as gases, vapors, or liquids may be freed of moisture by contacting them with susbtances which adsorb water, but which remain inert to the fluid. Many materials have been suggested as dehumidifying agents, but the industrially useful ones are few and expensive. For example, adsorbents which have been used commercially as dehumidifying agents include silica gel, Activated Alumina, and activated carbon.

Other mineral adsorbents, i. e., clays, have been proposed as desiccants, but the proper method of preparing these substances to confer upon them an efficiency which would make them at least competitive with the commonly used drying agents above mentioned, has not been hitherto known or practiced. In many industrial operations it is essential that very dry gas be used, and to produce such a dry gas it is necessary that the drying agent remove all, or substantially all, of the moisture from the gas. The ordinary drying of clays to remove free moisture produces materials which will remove gross amounts of moisture from gases passed through such materials, but enough water may remain in the effluent gases to render them unfit for certain uses. Thermal treatment of the clays at temperatures up to about 220° F. results in the removal of all of the free moisture and improves the drying characteristics of the clays, but fails to produce dehumidifying agents capable of removing substantially all moisture from a gas.

I have found that to obtain an acceptable drying efficiency with argillaceous adsorbents such as bentonite, acid activated bentonite, and fuller's earth, it is necessary to remove all of the free moisture and not less than 18% by weight of the combined water, i. e., that remaining after the adsorbent has been heated at 220° F. to constant weight. Depending upon the nature of the adsorbent, from about 18% to 70% by weight of combined water must be removed to obtain dehumidifying agents capable of producing substantially dry air, with an adsorptive capacity equal or superior to that of the more expensive drying agents mentioned hereinbefore. Dehumidifying agents prepared in accordance with my invention from bentonite, acid activated bentonite, and fuller's earth are capable of producing substantially completely dehumidified air, with adsorptive capacities within the range of 7% to 18%. Clays which have been heated under conditions which effect elimination of less than 18% by weight of combined water will adsorb moisture, but such adsorbents are useless where substantially complete dehumidification is required. An acceptable drying efficiency and capacity for water adsorption are only obtained by removing all of the free moisture and not less than 18% by weight of the combined water, and preferably between 25% and 45% of the combined water. In most cases, up to 70% of the combined water may be removed without affecting the ability of the adsorbent to completely remove moisture from a gas passing through it, but the adsorptive capacity decreases as the temperature of heating is increased.

I have found that bentonite, acid activated bentonite, and fuller's earth, particularly Georgia-Florida type fuller's earth, all respond to my method of thermal activation in which all of the free moisture and not less than 18% of the combined water is removed. The degree of response is not the same for all three types of adsorbent material, and, indeed, is not constant within the same type, since natural products vary in composition and physical properties within a rather wide range without losing their identity.

In order to eliminate the free moisture and not less than 18% of the combined water from bentonite, acid activated bentonite, and fuller's earth, it is necessary to heat them at temperatures above 220° F. for various periods of time, depending upon the adsorbent being treated. In the thermal treatment of the adsorbents, as the temperature is raised the amount of moisture expelled is larger for a given period of heating. I have found that the minimum temperature at which the free moisture and 18% of the combined water can be eliminated is about 250° F., but the time required is usually in excess of 15 hours, and since this is excessive for commercial practice, I prefer to use a temperature of at least 260° F., at which temperature the activation can be effected in a considerably shorter time. Exposure of the adsorbents to higher temperatures for shorter periods of time, i. e., sufficient to remove the free moisture and not less than 18% of the combined water, can be utilized. Considerably more than 18% of the combined water, e. g., up to 70% of the combined water, may be expelled by heating at higher temperatures for longer periods without destroying the ability of the activated adsorbent to produce dry gas. When more than 70% of the combined water is driven off, the adsorptive capacity is reduced to such an extent as to render the adsorbent commercially uninteresting as a dehumidifying agent.

In carrying out my invention, I heat an adsorbent such as bentonite, acid activated bentonite, or fuller's earth at an elevated temperature for a period of time sufficient to remove the free moisture and from 18% to 70% by weight of the combined water, and preferably from 25% to 45% of the combined water. The total volatile matter content of the resulting thermally treated adsorbent is of the order of 4% to 10% by weight, and preferably 4% to 7% by weight. The heat treatment may be carried out at a temperature between 250° F. and 700° F., and preferably between 260° F. and 500° F., for a period of time ranging from ½ hour to 15 or 20 hours, depending upon the nature of the adsorbent and the temperature employed. Although somewhat higher temperatures, i. e., up to about 1000° F., may be utilized, I prefer a maximum temperature not substantially in excess of about 700° F. The adsorbent material to be thermally treated may be in finely divided condition or in the form of granules or particles of desired size, for example, 4–8 mesh, 8–20 mesh, 30–60 mesh, or the like. For dehydrating liquids, a finely divided adsorbent may be used, whereas in the dehumidification of vapors or gases, a granular adsorbent of 4–8 mesh or other desired particle size is preferably employed. Since some clays, e. g., acid activated bentonites, are commercially produced in a finely divided condition, such adsorbents must be formed into granules of suitable size before use in the dehumidification of gases or vapors. This may be accomplished by rendering the adsorbent plastic by the addition of water and extruding the plastic adsorbent, at elevated pressure, through an extrusion press provided with a perforated die plate to form extruded rods or shapes having appreciable mechanical strength. To obtain satisfactory extrusion the water content of the plastic adsorbent should be of the order of 30% to 60% by weight. These rods or shapes are then dried at relatively low temperature, i. e., 180° F. to 220° F., to reduce the volatile matter content to about 15%—25% by weight. The dry rods are then crushed and screened to obtain an adsorbent of desired particle size, for example, 4–8 mesh. The resulting granules are then thermally treated in a suitable heating apparatus, such as a rotary kiln, under the proper conditions of temperature and time to remove all of the free moisture and from 18% to 70% of the combined water. In utilizing fuller's earth, such earth may be plasticized and extruded as above described, or the raw earth, as mined, may simply be dried at low temperature, ground and screened to desired size, and thereafter subjected to heat treatment to remove the free moisture and from 18% to 70% of the combined water.

My invention may be further illustrated by the following examples showing the production of dehumidifying agents from bentonite, acid activated bentonite, and fuller's earth, and the use of the resulting agents in the dehumidification of a gas such as air.

A sample of an acid activated bentonite, commercially marketed under the name of "Filtrol," having a volatile matter content of 21% by weight was mixed with sufficient water to produce a total volatile matter content of 47% by weight, and the plastic mixture as extruded, at elevated pressure, from an extrusion press in the form of firm rods which were then dried to a volatile matter content of 22% by weight. The dried rods were crushed and screened to produce 8–20 mesh granules. Samples of the granules were then thermally treated at different temperatures to remove the free moisture and varying amounts of combined water, and then tested for their ability to produce completely dehumidified air, as shown in the table given below.

A sample of bentonite from the vicinity of Polkville, Miss., having a volatile matter content of 21% by weight was mixed with sufficient water to produce a total volatile matter content of 36.8% by weight, and the plastic mixture was extruded, at elevated pressure, from an extrusion press in the form of firm rods which were then dried to a volatile matter content of 22% by weight. The dried rods were crushed and screened to produce 8–20 mesh granules. Samples of the granules were then thermally treated at different temperatures to remove the free moisture and varying amounts of combined water, and then tested for their ability to produce completely dehumidified air, as shown in the table given below.

A sample of raw fuller's earth from Attapulgus, Georgia, having a volatile matter content of 48.5% of weight was dried at a temperature of 185° F. to a volatile matter content of 19.5% by weight. The dried earth was crushed and screened to produce 8–20 mesh granules. Samples of the granules were then thermally treated at different temperatures to remove the free moisture and varying amounts of combined water, and then tested for ability to produce completely dehumidified air, as shown in the table given below.

The per cent volatile matter (V. M.) shown in the tables is the total volatile matter driven off by heating the samples at 1800° F. to constant weight. The per cent water removed, as given in the tables, represents the per cent by weight of combined water driven off by heating at the temperatures given. The dry air capacity (D. A. C.) of the adsorbents represents the per cent water adsorbed, based on the original weight of the adsorbent before any water appears in the effluent air. The D. A. C. was determined by passing a measured volume of air of known and constant humidity through a known weight of adsorbent contained in an adsorption tower at constant temperature. The effluent air from the adsorption tower was passed through a moisture detection tube containing magnesium perchlorate, and the adsorption tower and contents, as well as the detection tube, were weighed periodically to determine the amount of moisture adsorbed and the time at which moisture was first detectable in the effluent air from the adsorption tower.

Filtrol

| Heating | | Percent V. M. | Percent H₂O remov. | D. A. C. | Air | |
|---|---|---|---|---|---|---|
| °F. | Hrs. | | | | Moisture (mg./l.) | Dew point |
| | | | | | | °F. |
| 220 | Const. wt. | 9.95 | 0.00 | -------- | 0.322 | -21 |
| 250 | 15 | 8.20 | 19.2 | 13.30 | 0.0220 | -63 |
| 260 | 6 | 7.06 | 31.2 | 17.83 | (¹) | -98 |
| 400 | ½ | 5.84 | 43.9 | 13.03 | (¹) | -98 |
| 500 | ½ | 5.10 | 51.3 | 11.05 | (¹) | -98 |
| 600 | ½ | 4.63 | 55.9 | 9.38 | (¹) | -98 |
| 700 | ½ | 4.35 | 58.8 | 8.28 | (¹) | -98 |

Attapulgus clay

| Heating | | Percent V. M. | Percent H₂O remov. | D. A. C. | Air | |
|---|---|---|---|---|---|---|
| °F. | Hrs. | | | | Moisture (mg./l.) | Dew point |
| | | | | | | °F. |
| 220 | Const. wt. | 12.35 | 0.00 | -------- | 0.261 | -22 |
| 250 | 15 | 10.33 | 18.2 | 8.01 | 0.0243 | -62 |
| 260 | 6 | 9.50 | 25.1 | 9.75 | (¹) | -98 |
| 400 | ½ | 6.95 | 47.0 | 12.10 | (¹) | -98 |
| 500 | ½ | 5.93 | 55.3 | 10.38 | (¹) | -98 |
| 600 | ½ | 4.86 | 62.7 | 8.86 | (¹) | -98 |
| 700 | ½ | 3.78 | 72.1 | 7.70 | (¹) | -98 |

Polkville bentonite

| Heating | | Percent V. M. | Percent H₂O remov. | D. A. C. | Air | |
|---|---|---|---|---|---|---|
| °F. | Hrs. | | | | Moisture (mg./l) | Dew point |
| | | | | | | °F. |
| 220 | Const. wt. | 9.60 | 0.00 | -------- | 0.200 | -28 |
| 250 | 15 | 7.16 | 27.3 | 13.49 | 0.0265 | -60 |
| 260 | 6 | 7.00 | 29.1 | 17.76 | (¹) | -98 |
| 400 | ½ | 5.79 | 42.1 | 15.32 | (¹) | -98 |
| 500 | ½ | 5.68 | 43.3 | 12.21 | (¹) | -98 |
| 600 | ½ | 5.50 | 45.3 | 9.08 | (¹) | -98 |
| 700 | ½ | 5.20 | 48.3 | 6.50 | (¹) | -98 |

¹ No detectable moisture.

In no case did the adsorbents heated at 220° F. produce any substantially completely dehumidified air. Filtrol attained its highest adsorptive capacity (17.83%) when all of the free moisture and 31.2% of the combined water was removed. On the other hand, Attapulgus clay attained its highest adsorptive capacity (12.10%) when all of the free moisture and 47% of the combined water was removed. In the case of the Polkville bentonite, the highest adsorptive capacity (17.75%) was obtained when all of the free moisture and 29.1% of the combined water was removed. While it is preferable to heat the adsorbents under conditions which will produce the maximum adsorptive capacity, industrially competitive and useful adsorption capacities of the order of 7% to 10% may be produced in accordance with my invention, using time-temperature conditions at either end of the range set forth herein.

The activation of argillaceous substances of the type described results in highly efficient drying agents, but the particles are disintegrated in contact with liquid water, and must, therefore, be protected from liquid water when in service. This can be readily accomplished by passing the gas to be dried through a trap which removes liquid water and permits only the water vapor-bearing gas to enter the adsorbent container. The subject dehumidifying agents do not slake, swell, or disintegrate in contact with water vapor. The following table shows the amount of water, expressed as per cent of the initial weight of the adsorbent, taken up at the saturation point. The temperature of the gas and of the adsorbent was 80° F.

| Per cent humidty | 10 | 75 | 100 |
|---|---|---|---|
| | Per cent | Per cent | Per cent |
| Filtrol | 3.7 | 18.4 | 36.3 |
| Attapulgus clay | 6.4 | 12.6 | 37.1 |
| Polkville bentonite | 7.3 | 23.1 | 34.4 |

The tendency to disintegrate in contact with liquid water may be eliminated by heating the bentonites to temperatures of 800° F. and above, while Filtrol and fuller's earth can be rendered non-disintegrable by heating at temperatures of 600° F. or above for a suitable period of time.

Dehumidifying adsorbents produced in accordance with the present invention have been found to be regenerable at lower temperatures than other types of desiccants, such as silica gel, Activated Alumina, or activated carbon. The completeness of regeneration at a given temperature and time depends primarily on the temperature of initial activation. Activation or heat treatment at temperatures within the range of 250° F. to 700° F. produces materials from which 90% to 100% of the adsorbed water can be removed in a relatively short time (4 to 8 hours) by regenerating at temperatures within the range of 250° F. to 400° F. The results of regenerating at various temperatures are shown in the following table:

| Adsorbent | Activation temp., °F. | Per cent of adsorbed water ¹ removed by heating for— | | |
|---|---|---|---|---|
| | | 8 hours at 250° F. | 4 hours at 350° F. | 4 hours at 400° F. |
| Filtrol | 300 | 96.7 | | |
| Do | 400 | 95.1 | | |
| Do | 700 | 87.8 | | |
| Do | 1,100 | 69.2 | | |
| Polkville bentonite | 400 | 99.3 | | 94.7 |
| Do | 700 | 92.0 | | |
| Do | 1,100 | 59.7 | | |
| Attapulgus clay | 400 | | 85.0 | 98.3 |

¹ Adsorbed water = amount of water adsorbed during the period the adsorbent passed no detectable moisture.

The adsorptive agents prepared in accordance with my invention may be employed to partially or completely dehumidify a variety of fluids, including gases such as air, oxygen, hydrogen, nitrogen, and carbon dioxide, and hydrocarbon gases such as methane, ethane, propane, butane, isobutane, and the corresponding olefin gases, or mixtures of two or more thereof. A variety of other compounds may likewise be dehumidified or dehydrated in the vapor or liquid phase, including hydrocarbon oils or distillates, benzene, toluene, xylene, halogenated hydrocarbons, alcohols, esters, ketones, and the like.

Herein, and in the appended claims, the term "bentonite" comprehends natural clays, which when treated with a mineral acid such as sulfuric acid or hydrochloric acid under suitable conditions, yield adsorbents of enhanced oil bleaching efficiency. The term "acid activated bentonite" comprehends the products obtained by the acid treatment of "bentonite" above referred to. Typical examples of "bentonite"

which may be processed in accordance with the present invention to produce highly efficient dehumidifying agents are the natural bentonitic clays mined in Smith County, Miss., Apache County, Ariz., and Woodward County, Okla. It will be understood that these specific examples are not limitative, but merely illustrative of material which may be processed in accordance with my invention.

I claim:

1. The method of dehumidifying fluids, which comprises intimately contacting a fluid containing moisture with acid activated bentonite from which the free moisture and from 18% to 70% by weight of the combined water has been removed.

2. The method of dehumidifying fluids, which comprises intimately contacting a fluid containing moisture with acid activated bentonite which has been heated at an elevated temperature for a sufficient period of time to remove from said acid activated bentonite the free moisture and from 18% to 70% by weight of the combined water.

3. The method of dehumidifying fluids, which comprises intimately contacting a fluid containing moisture with acid activated bentonite which has been heated at a temperature between 250° F. and 700° F. for a sufficient period of time to remove from said acid activated bentonite the free moisture and from 18% to 70% by weight of the combined water.

4. The method of dehumidifying fluids, which comprises intimately contacting a fluid containing moisture with acid activated bentonite which has been formed into granules and heated at an elevated temperature for a sufficient period of time to remove from said acid activated bentonite the free moisture and from 18% to 70% by weight of the combined water.

5. The method of dehumidifying fluids, which comprises intimately contacting a fluid containing moisture with acid activated bentonite which has been formed into granules and heated at a temperature between 250° F. and 700° F. for a sufficient period of time to remove from said acid activated bentonite the free moisture and from 18% to 70% by weight of the combined water.

6. The method of dehumidifying fluids, which comprises intimately contacting a fluid containing moisture with acid activated bentonite having a total moisture content of from 4% to 10% by weight.

7. The method of dehumidifying fluids, which comprises intimately contacting a fluid containing moisture with acid activated bentonite heated at a temperature between 250° F. and 700° F. to a total moisture content of from 4% to 10% by weight.

WILLIAM A. LA LANDE, Jr.